US011942234B2

(12) United States Patent
Huang et al.

(10) Patent No.: US 11,942,234 B2
(45) Date of Patent: Mar. 26, 2024

(54) COAXIAL CABLE AND CABLE ASSEMBLY

(71) Applicant: Hitachi Metals, Ltd., Tokyo (JP)

(72) Inventors: Detian Huang, Tokyo (JP); Takanobu Watanabe, Tokyo (JP); Hiromitsu Kuroda, Tokyo (JP); Hideki Nonen, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 0 days.

(21) Appl. No.: 17/410,742

(22) Filed: Aug. 24, 2021

(65) Prior Publication Data

US 2022/0076864 A1 Mar. 10, 2022

(30) Foreign Application Priority Data

Sep. 10, 2020 (JP) ................................ 2020-151819

(51) Int. Cl.
*H01B 11/00* (2006.01)
*H01B 7/08* (2006.01)
*H01B 11/10* (2006.01)
*H01B 11/18* (2006.01)
*H01B 11/20* (2006.01)

(52) U.S. Cl.
CPC ............... *H01B 11/20* (2013.01); *H01B 7/08* (2013.01); *H01B 11/1041* (2013.01); *H01B 11/1808* (2013.01)

(58) Field of Classification Search
CPC .......... H01B 5/10; H01B 7/226; H01B 9/025; H01B 11/1041
See application file for complete search history.

(56) References Cited

U.S. PATENT DOCUMENTS

| | | | | |
|---|---|---|---|---|
| 10,991,485 B2 * | 4/2021 | Huang | ................. | H01B 11/183 |
| 11,437,692 B2 * | 9/2022 | Huang | ...................... | H01P 3/06 |
| 2021/0217542 A1 * | 7/2021 | Chuganey | .......... | H01B 11/1821 |
| 2021/0399396 A1 * | 12/2021 | Huang | ...................... | H01P 3/06 |

FOREIGN PATENT DOCUMENTS

| | | | |
|---|---|---|---|
| JP | 2000-285747 A | | 10/2000 |
| JP | 2003-045244 | * | 2/2003 |
| JP | 2014-191884 | * | 10/2014 |

* cited by examiner

*Primary Examiner* — Chau N Nguyen
(74) *Attorney, Agent, or Firm* — MCGINN I.P. LAW GROUP, PLLC.

(57) ABSTRACT

A coaxial cable is composed of a conductor, an insulator covering a periphery of the conductor, a shield layer covering a periphery of the insulator, and a sheath covering a periphery of the shield layer. The shield layer is configured to include a lateral winding shielding portion with a plurality of metal wires being helically wrapped around the periphery of the insulator, and a batch plating portion made of a hot-dip plating covering respective peripheries of the lateral winding shielding portion. The shield layer includes a joining portion where the metal wires adjacent to each other in a circumferential direction are joined with each other with the batch plating portion at a spaced portion where the adjacent metal wires are spaced apart from each other, and the non-joining portion where the metal wires adjacent to each other in the circumferential direction are not joined with each other with the batch plating portion at the spaced portion. A length of the non-joining portion along a cable longitudinal direction is shorter than a winding pitch of the lateral winding shielding portion.

20 Claims, 4 Drawing Sheets

COAXIAL CABLE AND CABLE ASSEMBLY

CROSS-REFERENCE TO RELATED APPLICATION

The present application is based on Japanese patent application No. 2020-151819 filed on Sep. 10, 2020, the entire contents of which are incorporated herein by reference.

BACKGROUND OF THE INVENTION

1. Field of the Invention

The present invention relates to a coaxial cable and a cable assembly.

2. Description of the Related Art

A coaxial cable is used as a cable designed to carry out a high frequency signal transmission and to be used as an internal wiring in an image recording device to be used in an automatic operation or the like, or as an internal wiring in an electronic device such as a smartphone or a tablet terminal or the like, or as a wiring in a machine tool such as an industrial robot or the like.

As the conventional coaxial cable, there is known one with a shield layer being configured in such a manner that a taping member such as a copper tape or the like provided with a copper foil on a resin layer is helically wrapped around a periphery of an insulator (see, e.g., JP2000-285747A).

[Patent Document 1] JP2000-285747A

SUMMARY OF THE INVENTION

However, in the conventional coaxial cable described above, there is a problem with a phenomenon called "suck-out" occurring, which refers to a rapid attenuation caused in a predetermined frequency band (e.g., a band of several GHz such as 1.25 GHz or the like).

On the other hand, for example, by configuring the shield layer in such a manner that the outer surface of the insulator is subjected to a plating, it is possible to suppress the occurrence of the suck-out. However, when the coaxial cable has been repeatedly bent, a crack formation in its shield layer made of the plating has occurred or a peeling off of that shield layer made of the plating from the outer surface of the insulator has occurred. The occurrence of the crack formation in its shield layer made of the plating or the peeling off of that shield layer made of the plating from the outer surface of the insulator has led to a degradation in the shielding effect. That is, the shielding effect of the shield layer on the noise caused in the coaxial cable has been degraded.

In light of the foregoing, it is an object of the present invention to provide a coaxial cable, and a cable assembly, which are designed to be resistant to the occurrence of a degradation in the shielding effect, and to be resistant to the occurrence of a rapid attenuation in a predetermined frequency band.

For the purpose of solving the aforementioned problems, the present invention provides a coaxial cable, comprising:

a conductor;

an insulator covering a periphery of the conductor;

a shield layer covering a periphery of the insulator; and a sheath covering a periphery of the shield layer, wherein the shield layer includes a lateral winding shielding portion comprising a plurality of metal wires being helically wrapped around the periphery of the insulator to cover the periphery of the insulator, and a batch plating portion comprising a hot dip plating, which is covering a periphery of the lateral winding shielding portion, wherein the shield layer includes a joining portion where the metal wires adjacent to each other in a circumferential direction are joined with each other with the batch plating portion at a spaced portion where the adjacent metal wires are spaced apart from each other, and the non-joining portion where the metal wires adjacent to each other in the circumferential direction are not joined with each other with the batch plating portion at the spaced portion, wherein a length of the non-joining portion along a cable longitudinal direction is shorter than a winding pitch of the lateral winding shielding portion.

Furthermore, for the purpose of solving the aforementioned problems, the present invention provides a cable assembly, comprising: the above defined coaxial cable; and a terminal member integrally provided to at least one end portion of the above defined coaxial cable.

Points of the Invention

According to the present invention, it is possible to provide the coaxial cable, and the cable assembly, which are designed to be resistant to the occurrence of a degradation in the shielding effect, and to be resistant to the occurrence of a rapid attenuation in a predetermined frequency band.

BRIEF DESCRIPTION OF THE DRAWINGS

Next, preferred embodiment according to the present invention will be described with reference to appended drawings, wherein.

DETAILED DESCRIPTION OF THE PREFERRED EMBODIMENT

Embodiment

An embodiment of the present invention will be described below in conjunction with the accompanying drawings.

Figure 1A:
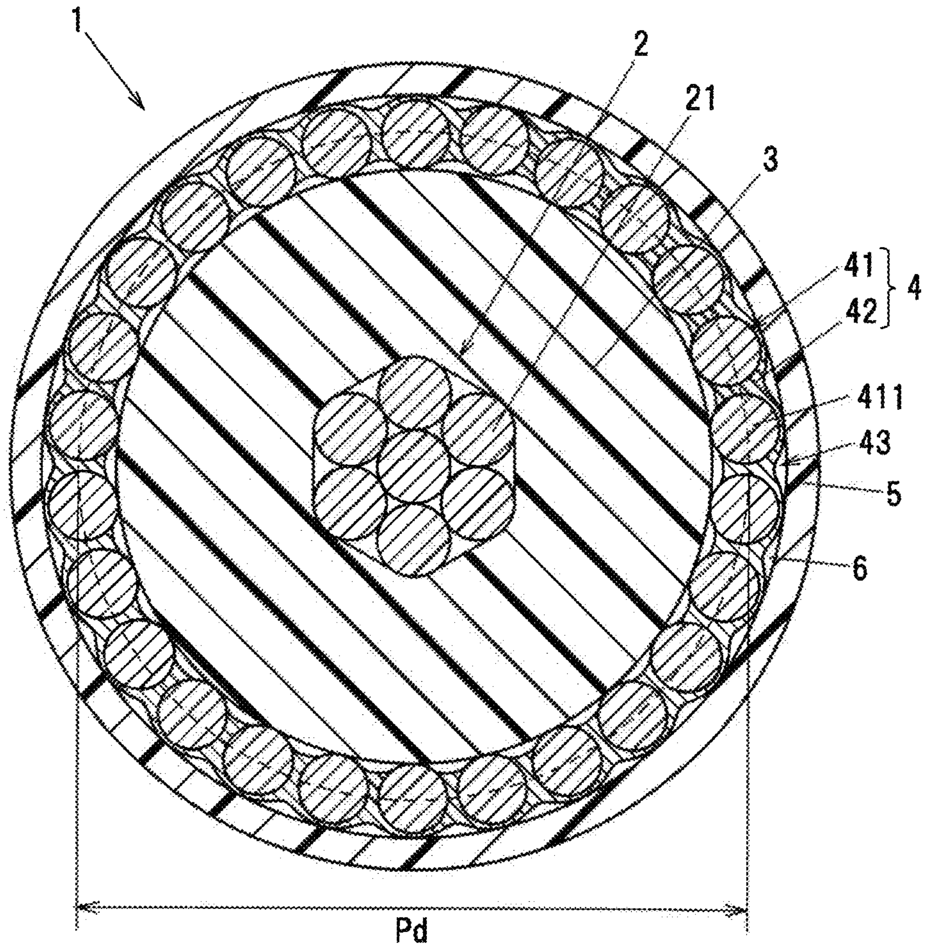
FIG. 1A is a cross-sectional view showing a cross section perpendicular to a longitudinal direction showing a coaxial cable according to one embodiment of the present invention.
Figure 1B:
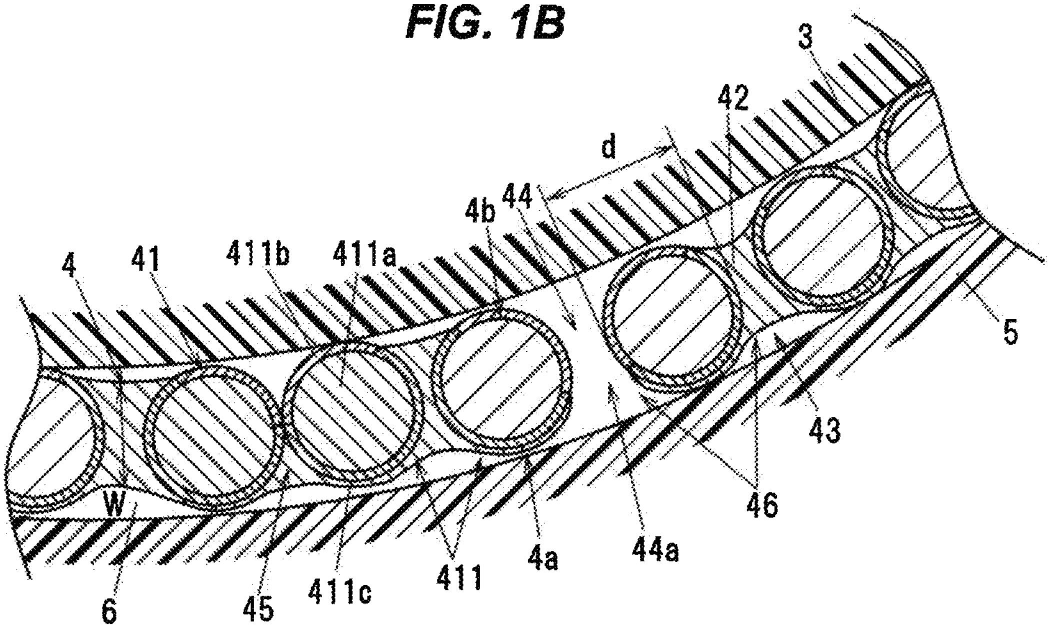
FIG. 1B is an enlarged view of an essential portion of the coaxial cable shown in FIG. 1A.

FIG. 1A is a cross-sectional view showing a cross section perpendicular to a longitudinal direction showing a coaxial cable 1 according to the present embodiment, and FIG. 1B is an enlarged view of an essential portion of the coaxial cable 1 shown in FIG. 1A.

As shown in FIGS. 1A and 1B, the coaxial cable 1 includes a conductor 2, an (electrical) insulator 3, which is provided to cover a periphery of the conductor 2, and a shield layer 4, which is provided to cover a periphery of the insulator 3, and a sheath 5, which is provided to cover a periphery of the shield layer 4.

The conductor 2 is composed of a stranded wire conductor, which is formed by stranding a plurality of metal wires 21 together. In the present embodiment, the conductor 2 formed by stranding seven metal wires 21 each made of an annealed copper (soft copper) wire of an outer diameter of 0.023 mm is used. The configuration of the conductor 2 is not limited thereto, but the conductor 2 can also be configured to use a compressed stranded wire conductor, which is produced by stranding the plurality of metal wires 21 together, and subsequently subjecting the stranded metal wires 21 to a compression working in such a manner that the cross-sectional shape of the stranded metal wires 21, which is perpendicular to the longitudinal direction of the coaxial cable 1, becomes a circular shape. The use of the compressed stranded wire conductor as the conductor 2 allows the electrical conductivity of the conductor 2 to be enhanced, the good transmission property of the conductor 2 to be obtained, and the high bendability of the conductor 2 to be maintained. Further, the plurality of metal wires 21 may be configured to use a copper alloy wire including tin (Sn), silver (Ag), indium (In), titanium (Ti), magnesium (Mg), iron (Fe) or the like, from the point of view of enhancing the electrical conductivities and the mechanical strengths of the plurality of metal wires 21.

The insulator 3 is configured to be made of, e.g., PFA (perfluoro alkoxy alkane), or FEP (fluorinated ethylene tetrafluoride/propylene hexafluoride copolymer) fluoropolymer resin, polyethylene, polypropylene or the like. The insulator 3 may be configured to use a foamed resin, or may be configured with a crosslinked resin in order to enhance the heat resistance of the insulator 3. Further, the insulator 3 may be configured to have a multi-layer structure. For example, the insulator 3 can also be configured to have a three-layer structure composed of a first non-foamed layer made of non-foamed polyethylene, which is covering a periphery of the conductor 2, a foamed layer made of foamed polyethylene, which is covering a periphery of the first non-foamed layer, and a second non-foamed layer made of non-foamed polyethylene, which is covering a periphery of the foamed layer. In the present embodiment, the insulator 3 made of PFA is formed over the periphery of the conductor 2 by tube extrusion. By forming the insulator 3 over the periphery of the conductor 2 by the tube extrusion, the insulator 3 is easily peeled off from the conductor 2 during termination working, and the termination workability is therefore enhanced.

In the coaxial cable 1 according to the present embodiment, the shield layer 4 includes a lateral winding shielding portion 41, which is formed by a plurality of metal wires 411 being helically wrapped around a periphery of the insulator 3, and a batch plating portion 42 having an electrical conductivity, which is provided to batch cover a periphery of the lateral winding shielding portion 41 together. It is preferable that the batch plating portion 42 is provided to batch coat the entire periphery of the lateral winding shielding portion 41 together in the circumferential direction and the axial direction of the coaxial cable 1, and mechanically and electrically connect the plurality of metal wires 411 together.

The shield layer 4 includes a contact portion 45 where adjacent metal wires 411, 411 are brought into contact with each other in the circumferential direction of the coaxial cable 1, and a spaced portion (space) 46 where the adjacent metal wires 411, 411 are spaced apart from each other in the circumferential direction of the coaxial cable 1. Further, the shield layer 4 includes a joining portion 43 where the adjacent metal wires 411, 411 in the circumferential direction are joined with each other with the batch plating portion 42, and a non-joining (separated) portion 44 where the adjacent metal wires 411, 411 in the circumferential direction are not joined with each other with the batch plating portion 42. The non-joining portions 44 are randomly dispersed at any locations in the cable longitudinal direction. Namely, the shield layer 4 includes, when being viewed as a cross-section in a direction perpendicular to the cable longitudinal direction, a cross-section including only the joining portion(s) 43 where the adjacent metal wires 411, 411 are joined with the batch plating portion 42 at the spaced portion 46 as shown in FIG. 1A. Meanwhile, the shield layer 4 also includes, in a part in the cable longitudinal direction, a cross-section including the non-joining portion(s) 44 where the adjacent metal wires 411, 411 are not joined with the batch plating portion 42 at the spaced portion 46 as shown in FIG. 1B. The non-joining portion(s) 44, which is present in a part in the cable longitudinal direction, is present in one or two locations of the spaced portions 46 are provided in the circumferential direction of the shield layer 4. A width of the non-joining portion 44 in the cable circumferential direction (a length along a side-by-side alignment direction of the plurality of metal wires 411 in a through hole 44*a* to be described later) is preferably smaller than an outer diameter of the metal wire 411, e.g., 0.005 mm or more and 0.050 mm or less. In each contacting portion 45, at the outer periphery of the lateral winding shielding portion 41, a space between the adjacent ones of the plurality of metal wires 411, 411 in the circumferential direction is filled with the batch plating portion 42, to provide a filled portion.

By providing the joining portion 43, the batch plating portion 42 would be less likely to crack and less likely to be peeled off when bending or twisting is applied, as compared to the case where all of the metal wires 411, 411 adjacent to each other in the circumference direction are brought into contact to each other. In other words, the joining portion 43, in which the metal wires 411, 411 spaced apart from each other are joined by the batch plating portion 42, is consisted of the batch plating portion 42 composed of the molten plating, which is more flexible than the metal wire 411. When bending or twisting is applied, the batch plating portion 42 of the interconnecting region acts to extend, thereby improving the flexibility of the entire shield layer 4. This makes it difficult for the batch plating portion 42 to crack or peel off when bending or twisting is applied thereto. As to the distance between the metal wires 411, 411 adjacent to each other in the circumferential direction, the function and effect described above would be obtained easily when a minimum distance from a surface of one metal wire 411 to a surface of the other metal wire 411 adjacent to the one metal wire 411 is equal to or less than half of the outer diameter of the metal wire 411. As to a surface of the joining portion 43 which is opposite to a surface (an outer surface) of the insulator 3 has a curved shape so that it recesses toward the inner side of the joining portion 43. With this curved shape, a predetermined gap can be generated between the surface of the insulator 3 and the surface of the joining portion 43. Thus, it is possible to achieve the coaxial cable 1, which is less likely to cause a reduction in the shielding effect and less likely to cause the rapid attenuation in a specific frequency band (for example, the frequency band up to 26 GHz).

In addition, a thickness W along the radial direction of the batch plating portion 42 at the joining portion 43 (a minimum straight-line distance from an inner surface to an outer surface of the batch plating portion 42 at the joining portion 43) is, e.g., 30% or more of the outer diameter (diameter) d of the metal wire 411 (0.3×d or more), it is less likely to cause the crack in the batch plating portion 42. Particularly when the thickness W of the batch plating portion 42 at the joining portion 43 is greater than or equal to the outer diameter d of the metal wire 411, a bonding strength of the metal wires 411, 411 increases, and it is even more difficult to cause the crack. In the coaxial cable 1, since the batch plating portion 42 has the joining portion 43 as described above, when the cable assembling is carried out, the plurality of metal wires 411 constituting the lateral winding shielding portion 41 are stuck to the batch plating portion 42. Therefore, it is easier to remove the shield layer 4 while winding the plurality of metal wires 411 spirally along the winding direction of the plurality of metal wires 411. For example, an upper limit of the thickness W of the batch plating portion 42 at the joining portion 43 is 130% of the outer diameter d of the metal wire 411 (1.3×d). The outer diameter d of the metal wire 411 is, e.g., 0.02 mm to 0.10 mm. The thickness W of the joining portion 43 and the outer diameter d of the metal wire 411 are obtained by observing the lateral cross-section of the coaxial cable 1 (the cross-section perpendicular to the longitudinal direction of the coaxial cable 1) using, e.g., an optical microscope or electron microscope.

For example, if the shield layer 4 is consisted of the lateral winding shielding portion 41, a gap will occur between the metal wires 411, 411 and the noise characteristics will be deteriorated. Moreover, the influence of the gap between the metal wires 411, 411 causes a phenomenon called a suck-out, which causes a rapid attenuation in a predetermined frequency band (for example, the band from 10 GHz to 25 GHz). In the present embodiment, the batch plating portion 42 consisting of the molten plating is provided to cover the entire circumference of the lateral winding shielding portion 41. Therefore, the batch plating portion 42 can block most of the gaps (the portions other than the non-joining portion 44 to be described later) between the metal wires 411, 411, thereby improving the shielding effect. This makes it less likely to cause the loss of signal transmission. Furthermore, by substantially eliminating the gaps between the metal wires 411, 411, it is possible to suppress the occurrence of the suck-out.

In addition, by providing batch plating portion 42 to cover the periphery of the lateral winding shielding portion 41, when the sheath 5 is removed at a cable end portion to expose the shield layer 4 during terminal processing, the metal wires 411, 411 becomes difficult to unravel. Therefore, it is possible to easily process the terminal. Furthermore, it is also possible to maintain a stable and constant impedance in the cable longitudinal direction by providing the batch plating portion 42 to cover the periphery of the lateral winding shielding portion 41.

As shown in FIG. 1B, the batch plating portion 42 is formed in a corrugated shape along the respective outer shapes of the plurality of metal wires 411 constituting the lateral winding shielding portion 41. That is, the batch plating portion 42 is of a concave shape in locations in the circumferential direction of the coaxial cable 1, which correspond to the locations between the adjacent metal wires 411, 411 in the circumferential direction of the coaxial cable 1, in other words, in the locations of the joining portions 43, and the batch plating portion 42 has air gaps 6 at the concave parts between the batch plating portion 42 and the sheath 5. By providing the air gap 6 on the joining portion 43, when the coaxial cable 1 is bent, the outer surface of the batch plating portion 42 can be stretched to follow that bending and, as a result, the batch plating portion 42 becomes resistant to the occurrence of a crack formation. Further, by providing the air gap 6 on the joining portion 43, the bendability of the coaxial cable 1 is also enhanced.

In the present embodiment, since the plurality of metal wires 411 are fixed with the batch plating portion 42, in order to ensure the high bendability of the coaxial cable 1, there is the need to use a metal wire made of a material having a low yield strength that is easily plastically deformed, in the plurality of metal wires 411. More specifically, a metal wire having a tensile strength of not lower than 200 MPa and not higher than 380 Pa and an elongation of not lower than 7 percent and not higher than 20 percent may be used in the plurality of metal wires 411.

In the present embodiment, for each of the plurality of metal wires 411, a silver-plated annealed copper wire having a plating layer 411*b* made of silver on the periphery of a metal wire 411*a* made of an annealed copper wire is used. Note that the metal wire 411*a* to be used in the plurality of metal wires 411 is not limited to the above annealed copper wire, but that a copper alloy wire, an aluminum wire, an aluminum alloy wire, or a wire rod having a low softening temperature with a trace amount of metal elements (e.g., titanium elements, magnesium elements, or the like) being added to a pure copper therein, or the like, can be used as the metal wire 411*a* to be used in the plurality of metal wires 411. Further, the metal for constituting the plating layer 411*b* is not limited to silver. For example, tin or gold may be used in the plating layer 411*b*, or the plating layer 411*b* can also be omitted. Herein, the lateral winding shielding portion 41 is formed by using twenty-two (22) metal wires 411 composed of a silver-plated annealed copper wire having an outer diameter of 0.02 mm.

Further, in the present embodiment, a plating portion made of tin is used in the batch plating portion 42 made of a hot dip plating. It should be noted, however, that the batch plating portion 42 is not limited thereto. For example, a plating portion composed of silver, gold, copper, zinc or the like can be used in the batch plating portion 42. It should be noted, however, that, from the point of view of the ease of the production, it can be said that it is more preferable to use the batch plating portion 42 composed of tin.

The batch plating portion 42 is formed by the plurality of metal wires 411 being laid together around the periphery of the insulator 3 to form the lateral winding shielding portion 41, and being subsequently passed through a bath with a molten tin being held therein. That is, the batch plating portion 42 is a hot dip plating layer formed by hot dip plating. In order to facilitate the batch adhesion of the tin to the entire periphery of the lateral winding shielding portion 41 together, it is desirable to apply the flux to the periphery of the lateral winding shielding portion 41 and subsequently pass the flux coated lateral winding shielding portions 41 through the bath with the tin melted at a temperature between 250° C. and 300° C. The wire velocity at the time of passing the wire rod formed with the lateral winding shielding portion 41 through the bath is, e.g., 40 m/min or more and 80 m/min or less, and more preferably 50 m/min or more and 70 m/min or less. As the flux, e.g., rosin-based flux or the like can be used. Further, unnecessary tin is removed by passing a wire rod on which the lateral winding shielding portion 41 is formed through the bath with the molten tin and then passing it through a die. At this time, by adjusting a hole diameter of the die, an adhered tin amount, i.e., the thickness of the batch plating portion 42 can be adjusted. By forming the batch plating portion 42 made of hot-dip plating by the method as described above, a fine non-joining portion 44 to be described later can be formed on the shield layer 4.

Figure 2A:
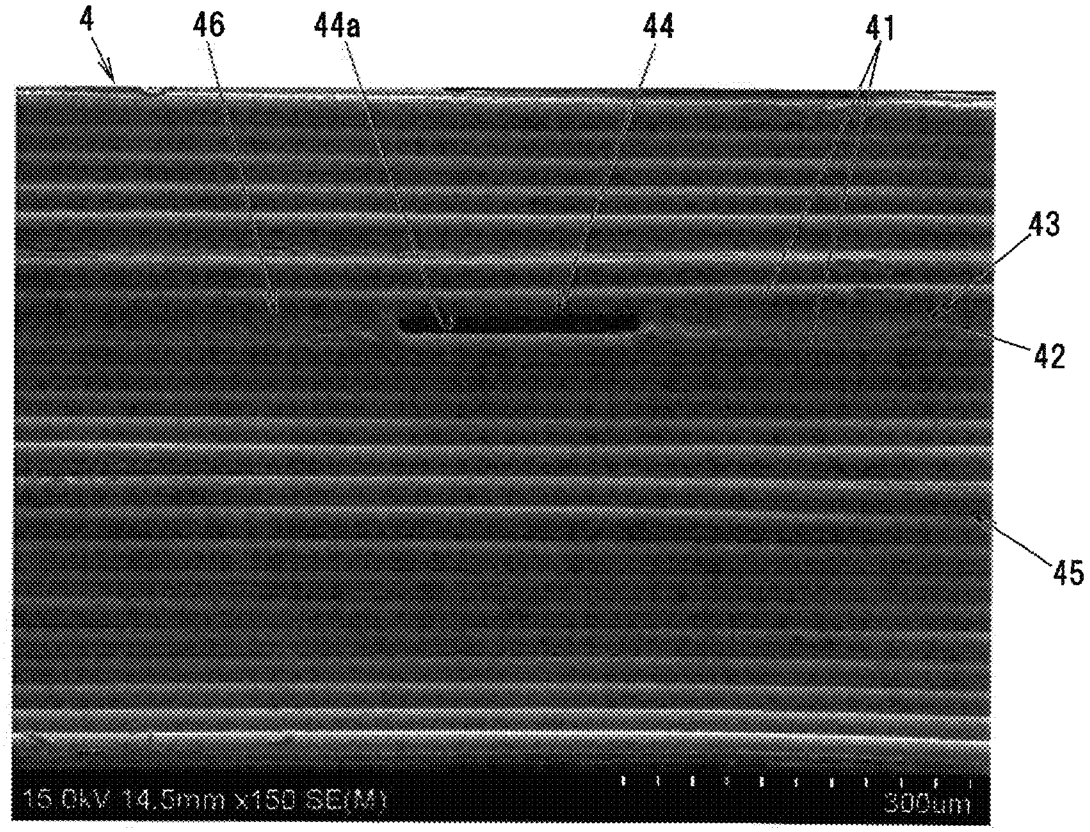
FIG. 2A is a photographic image showing a shield layer is stripped off from a surface of an insulator and viewed from an insulator-side.
Figure 2B:
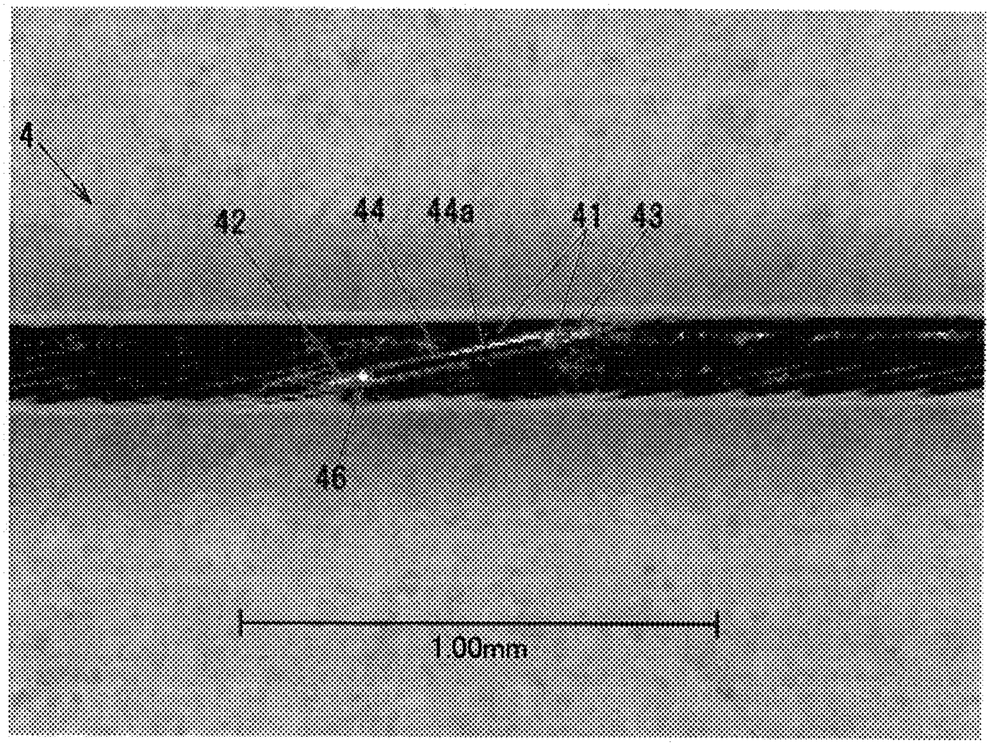
FIG. 2B is a photographic image showing an appearance after the shield layer is formed.

FIG. 2A is a photographic image showing the shield layer 4 which is stripped off from the surface of the insulator 3 and viewed from an insulator-side, and FIG. 2B is a photographic image showing an appearance after the shield layer 4 is formed (before the formation of the sheath 5). As shown in FIGS. 1A, 1B, 2A and 2B, in the coaxial cable 1 according to the present embodiment, a plurality of fine non-joining portions 44 are formed in the shield layer 4. Further, the non-joining portion 44 is composed of the through hole 44*a* that penetrates the batch plating portion 42 in the radial direction. The through hole 44*a* is formed in a slit shape between the metal wires 411, 411 adjacent to each other in the circumferential direction, and is formed spirally around the insulator 3 in such a manner that a long side of the slit shape is formed along the longitudinal direction of the metal wire 411. The through holes 44*a* shown in FIGS. 2A and 2B are dispersed (randomly) discontinuously in the cable longitudinal direction.

In the through hole 44*a*, which is the non-joining portion 44, when the tin adhering to the metal wire 411 (the above-mentioned molten tin) is cooled and solidified, some tin may move downward in the vertical direction or move toward the metal wires 411 due to the gravity and surface tension. Therefore, the position and size of the through hole 44*a* (a length along the longitudinal direction of the metal wire 411, hereinafter simply referred to as "length of the through hole 44*a*") are random. For example, when the through holes 44*a* are periodically formed in the cable longitudinal direction, a phenomenon called suck-out occurs in which the rapid attenuation occurs in a predetermined frequency band (for example, a band of several GHz such as 1.25 GHz). However, it is possible to suppress the occurrence of suck-out by randomly forming the through holes 44*a*. The number and length of the through holes 44*a* can be adjusted by adjusting the adhered tin amount, and can be adjusted by adjusting the hole diameter of the die as described above.

By providing a plurality of non-joining portions 44 between the joining portions 43 of the shield layer 4, the non-joining portion 44 relieves the stress when the coaxial cable 1 is bent, so that it is possible to suppress the batch plating portion 42 from being cracked or the metal wire 411 from being broken. As a result, it becomes possible to achieve the coaxial cable 1 in which the shielding effect is less likely to decrease during bending wiring and rapid attenuation does not easily occur in a predetermined frequency band. If the shield layer 4 has a through hole extending along the cable longitudinal direction, this through hole may greatly affect the shield characteristics. In the present embodiment, the through hole 44*a*, which is the non-joining portion 44, extends obliquely with respect to the cable longitudinal direction (i.e., a direction along the longitudinal direction of the metal wire 411), so that it is possible to suppress the influence of the through hole 44*a* on the shielding characteristic. Therefore, even if the through hole 44*a* is present, the deterioration in shield characteristic is less likely to occur.

The length of each of the plurality of through holes 44*a* (non-joining portions 44) along the cable longitudinal direction is shorter than a winding pitch of the lateral winding shielding portion 41. This is because when the length of each of the through holes 44*a* (non-joining portions 44) along the cable longitudinal direction is equal to or greater than the winding pitch of the lateral winding shielding portion 41, the through holes 44*a* (non-joining portions 44) are provided all around (namely, in one turn) the insulator 3, so that the resistance of the shield layer 4 may increase, which may adversely affect the transmission characteristics or deteriorate the shielding effect. The winding pitch of the lateral winding shielding portion 41 is an interval along the cable longitudinal direction at a position where the arbitrary metal wire 411 comes at the same position in the circumferential direction. The winding pitch of the lateral winding shielding portion 41 is preferably 6 times or more and 20 times or less a layer core diameter of a layer composed of the lateral winding shielding portion 41 (i.e., a value obtained by doubling the shortest distance between a cable center and a center of the metal wire 411) Pd. When the winding pitch is 6 times or more the layer core diameter Pd, the deterioration in shielding effect of the lateral winding shielding portion 41 is suppressed, and the deterioration in production efficiency is also suppressed. When the winding pitch is 20 times or less of the layer core diameter Pd, it is possible to suppress the lateral winding shielding portion 41 from loosening and increasing a separation distance between the adjacent metal wires 411, 411. Therefore, the batch plating portion 42 as described above can be stably formed, and the decrease in shielding effect can be suppressed.

More specifically, the length of each of the plurality of through holes 44*a* (non-joining portion 44) (the length along the longitudinal direction of the metal wire 411) is preferably 1.0 mm or less. According to this configuration, the deterioration in transmission characteristics and the deterioration in shielding effect due to the presence of the through hole 44*a* (non-joining portion 44) can be suppressed. Further, if the through hole 44*a* (non-joining portion 44) is too short, the stress when the coaxial cable 1 is bent may not be sufficiently relaxed. Therefore, the length of the through hole 44*a* (non-joining portion 44) is preferably 0.1 mm or more, and more preferably 0.1 mm or more and 1.0 mm or less.

If a width (a width along the cable circumferential direction) of the through hole 44*a* (non-joining portion 44) is too wide, the transmission characteristics may be deteriorated and the shielding effect may be deteriorated. Since the width of the through hole 44*a* (non-joining portion 44) is substantially equal to the distance between the metal wires 411, 411, it can be adjusted by the distance between the metal wires 411, 411. In the present embodiment, a sum of the distances between the metal wires 411, 411 adjacent to each other in the circumferential direction over the entire circumference is made smaller than the outer diameter of one metal wire 411. Therefore, the width of each of the plurality of through holes 44*a* (non-joining portions 44) is at least smaller than the outer diameter of the metal wire 411. More specifically, the sum of the distances between the metal wires 411, 411 adjacent to each other in the circumferential direction over the entire circumference, i.e., the maximum value of the width of the through hole 44*a* is preferably 5% or less of a diameter of a circle passing through the centers of the metal wires 411 (an intermediate value between the inner diameter and the outer diameter of the lateral winding shielding portion 41). As a result, the deterioration in transmission characteristics and the deterioration in shielding effect due to the width of the through hole 44*a* (non-joining portion 44) being too wide can be suppressed.

Further, if the number of through holes 44*a* (non-joining portions 44) is too small, the effect of stress relaxation when the coaxial cable 1 is bent may not be sufficiently obtained, and if it is too large, the deterioration in transmission characteristics and the deterioration in shielding effect may be caused. When the present inventors made a prototype of the coaxial cable 1 and observed it, it was confirmed that 10 or more and 20 or less of through holes 44*a* (non-joining portions 44) each having a length of 0.1 mm or more and 1.0 mm or less were formed for each 1 m coaxial cable 1. Although the details will be described later, in this prototype coaxial cable 1, since the occurrence of suck-out was suppressed and good transmission characteristics were obtained, it can be said, at least, the effect of suppressing the deterioration in transmission characteristics would be obtained by setting the number of through holes 44*a* (non-joining portion 44) to 10 or more and 20 or less.

In forming the batch plating portion 42, silver constituting the plating layer 411*b* in the part of the metal wire 411 to be brought into contact with the molten tin (in other words, the hot dip plating) is diffused into that molten tin in the bath, and an intermetallic compound 411*c* including copper and tin is formed between the metal wire 411 and the batch plating portion 42 (in other words, in the part between the metal wire 411*a* and the batch plating portion 42, and in abutment with a surface of the metal wire 411). As a result of EDX analysis (analysis by energy dispersion type X-ray spectroscopy) using an SEM (scanning electron microscope) by the present inventors, the intermetallic compound 411*c* composed of copper and tin was confirmed as having occurred in the form of a layer on the surface of the metal wire 411 (between the metal wire 411 and the batch plating portion 42). That is, the intermetallic compound 411*c* is a compound formed with a compound layer on the surface of the metal wire 411 being produced by a metallic diffusion reaction between the metal element (tin, or the like), which constitutes the batch plating portion 42 made of a hot dip plating, and the metal element (copper, or the like), which constitutes the primary component of the metal wire 411. A thickness of a layer of the intermetallic compound 411*c* is on the order of e.g., from 0.2 μm to 1.5 μm. Note that although silver constituting the plating layer 411*b* is considered to be included in the intermetallic compound 411*c*, an amount of silver included in the intermetallic compound 411*c* is a trace amount which is difficult to be detect by the EDX analysis.

By the shield layer 4 being formed with the intermetallic compound 411*c* between the metal wire 411 and the batch plating portion 42, when the coaxial cable 1 is repeatedly subjected to a bending or a torsion, the batch plating portion 42 becomes resistant to the occurrence of a peeling off the surface of the metal wire 411, and becomes resistant to the occurrence of a gap formation between the metal wire 411 and the batch plating portion 42. As a result, in the coaxial cable 1, even when subjected to a bending or a torsion, the batch plating portion 42 is able to hold the lateral winding shielding portion 41 in a state of being fixed from the outer side of the lateral winding shielding portion 41, and thereby becomes resistant to the occurrence of a change in the distance between the shield layer 4 and the conductor 2. For that reason, it is possible to make the coaxial cable 1 resistant to the occurrence of a lowering in the shielding effect due to being subjected to a bending or a torsion, and also make the coaxial cable 1 resistant to the occurrence of a rapid attenuation in a predetermined frequency band. The thickness of the layer of the intermetallic compound 411*c* is obtained, for example by using an optical microscope or an electron microscope to observe the transverse cross section of the coaxial cable 1 (the cross section which is perpendicular to the longitudinal direction of the coaxial cable 1).

The plating layer 411*b* made of silver remains on the part of the metal wire 411 being not brought into contact with the batch plating portion 42 (i.e., the part of the metal wire 411 being not brought into contact with the tin melted during plating). That is, the plating layer 411*b* made of silver remains on the part of the metal wire 411 located inward (the insulator 3 side) in the radial directions of the coaxial cable 1. That is, the shield layer 4 in the coaxial cable 1 according to the present embodiment may be configured to be higher in the electrical conductivity in an inner peripheral portion 4*b* in which the plurality of metal wires 411 are not being coated with the batch plating portion 42, than in an outer peripheral portion 4*a* in which the plurality of metal wires 411 are coated with the batch plating portion 42. In the high frequency signal transmission, the electric current is concentrated in the insulator 3 side of the shield layer 4. Therefore, by providing the plating layer 411*b* including silver or the like having a high electrical conductivity in the inner peripheral portion 4*b* of the shield layer 4, it is possible to suppress the occurrence of lowering in the electrical conductivity of the shield layer 4, and thereby maintain the good attenuation property of the coaxial cable 1. The electrical conductivity of the tin plating constituting the batch plating portion 42 is 15% IACS, and the electrical conductivity of the silver plating constituting the plating layer 411*b* of the plurality of metal wires 411 is 108% IACS.

Note that the outer peripheral portion 4*a* refers to the portion in which the metal wire 411 is brought into contact with the plating (tin or the like) melted during hot dip plating (that is, the portion in which the intermetallic compound 411*c* is formed). The inner peripheral portion 4*b* refers to the portion in which the plating layer 411*b* made of a silver plating or the like is remaining.

Further, on a peripheral edge of the through hole 44*a* (non-joining portion 44), there is a sinking portion after contacting with the molten plating (tin or the like). In such a portion, silver constituting the plating layer 411*b* is diffused at the stage of contact with the molten plating (tin or the like), so that the intermetallic compound 411*c* is formed on the surface of the metal wire 411. That is, on the peripheral edge of the through hole 44*a* (non-joining portion 44), there is an exposed intermetallic compound 411 that is not covered by the batch plating portion 42.

The sheath 5 is composed of, e.g., fluoropolymer resin such as PFA or FEP or the like, polyvinyl chloride, cross-linked polyolefin, or the like. In the present embodiment, the sheath 5 made of fluoropolymer resin is formed by tube extrusion.

(Characteristic Evaluation of the Coaxial Cable 1)

The coaxial cable 1 was prepared and used as an Example in the present embodiment, and the frequency characteristics were evaluated. The cable length was set to 1 meter. In the coaxial cable 1 in Example, the conductor 2 was formed by collectively twisting seven metal wires 21 each of which is an annealed copper wire with an outer diameter of 0.023 mm, the insulator 3 was prepared by tube extrusion of PFA, the lateral winding shielding portion 41 was formed by spirally winding twenty-two metal wires 411, each of which is Ag-plated annealed copper wire with an outer diameter of 0.025 mm (43AWG), the batch plating portion 42 was prepared from a hot dip plating composed of molten tin, and the sheath 5 was formed from fluorine resin. In the evaluation of the frequency characteristics, the transmission characteristic S21 was measured using a network analyzer. The measurement range was from 10 MHz to 30 GHz and the output power was −8 dBm. The results of the measurement are shown in FIG. 3.

Figure 3:
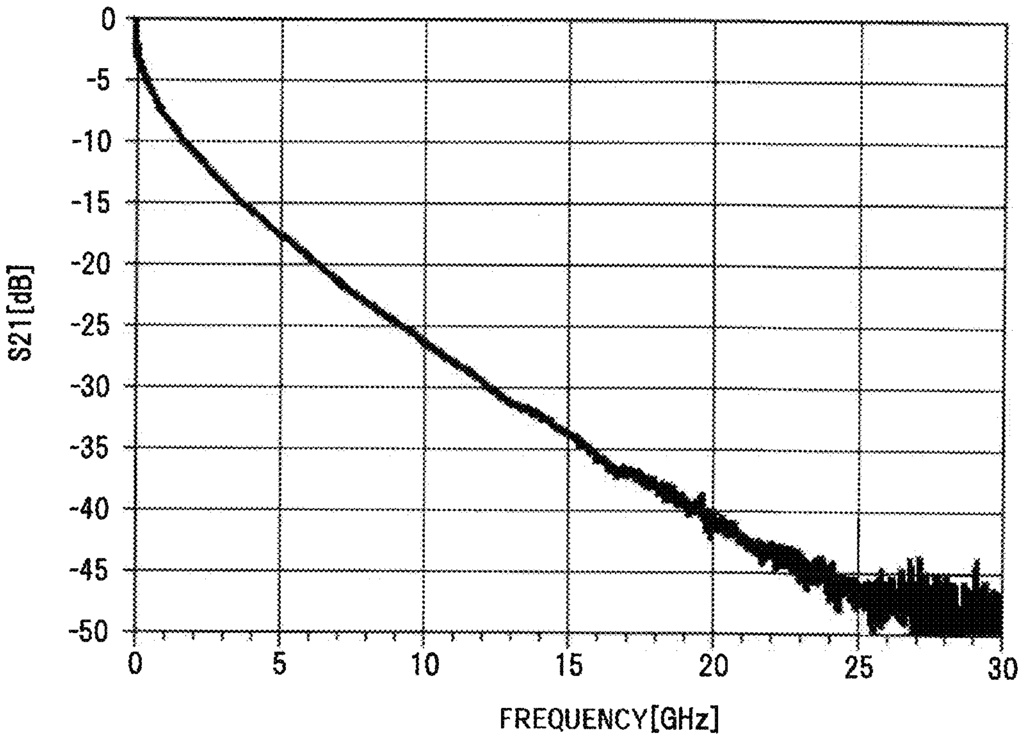
FIG. 3 is a graph showing a result of evaluation of frequency characteristics.

As shown in FIG. 3, it is confirmed that the coaxial cable 1 in Example has no rapid attenuation and the suck-out was suppressed from 20 GHz onwards (e.g., up to 26 GHz). Based on the results in FIG. 3, even if the through hole 44*a* (non-joining portion 44) is formed, the attenuation characteristic is not significantly affected, and the transmission characteristic is hardly deteriorated. Further, it is confirmed that the suck-out free was achieved at least in the frequency band of 25 GHz or less.

(Cable Assembly)

Figure 4:
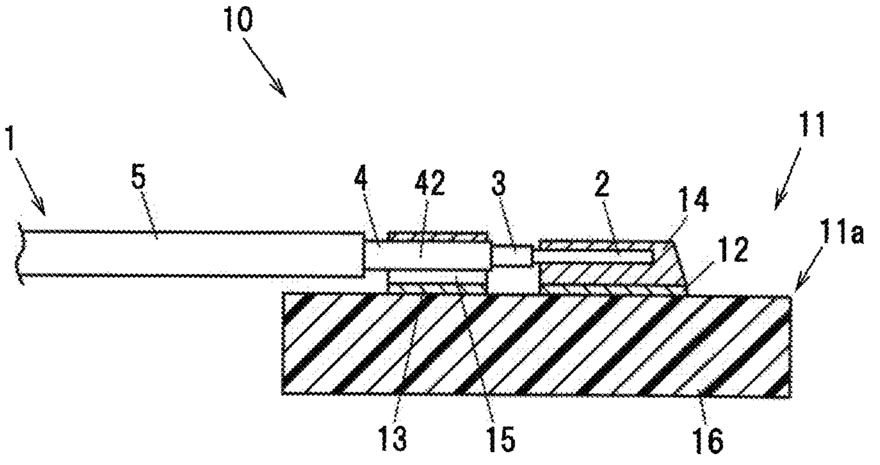
FIG. 4 is a diagram showing a cross-sectional view of a terminal portion of a cable assembly according to the first embodiment of the present invention.

Next, the cable assembly using the coaxial cable 1 will be described below. FIG. 4 is a diagram showing a cross-sectional view of a terminal portion of the cable assembly according to the first embodiment of the present invention.

As shown in FIG. 4, a cable assembly 10 includes the coaxial cable 1 in the present embodiment, and a terminal member 11 provided integrally with at least one end of the coaxial cable 1.

The terminal member 11 is, e.g., a connector, a sensor, a substrate mounted in the connector or sensor, or a board in an electronic device. FIG. 4 shows the case where the terminal member 11 is a substrate 11*a*. On the substrate 11*a*, there are formed a signal electrode 12 to which the conductor 2 is connected and a ground electrode 13 to which the shield layer 4 is connected. The substrate 11*a* is composed of a printed circuit board in which a conductor pattern including the signal electrode 12 and the ground electrode 13 is printed on a base material 16 composed of resin.

At the terminal portion of the coaxial cable 1, the sheath 5 is removed from the terminal for a predetermined length to expose the shield layer 4, and terminal portions of the shield layer 4 and the insulator 3 are further removed to expose the conductor 2. The exposed conductor 2 is secured to the signal electrode 12 with a bonding material 14 such as solder, and the conductor 2 is electrically connected to the signal electrode 12. In addition, the exposed shield layer 4 is secured to the ground electrode 13 with a bonding material 15 such as solder, and the shield layer 4 is electrically connected to the ground electrode 13.

The connection of the conductor 2 or the shield layer 4 may be performed without using the bonding material 14 or 15 such as solder. For example, the conductor 2 or the shield layer 4 may be connected by caulking the conductor 2 or the shield layer 4 to be connected to a fixing clasp. In addition, if the terminal member 11 is a connector or sensor, the conductor 2 or the shield layer 4 may be connected directly to the electrode or element.

(Functions and Effects of the First Embodiment)

As explained above, in the coaxial cable 1 according to the first embodiment, the shield layer 4 includes a lateral winding shielding portion 41, which is formed by the plurality of metal wires 411 being helically wrapped around a periphery of the insulator 3, and the batch plating portion 42 composed of the molten plating and provided to cover the periphery of the lateral winding shielding portion 41. The shield layer 4 further includes the joining portion 43 where the metal wires 411, 411 adjacent to each other in the circumferential direction are joined with each other with the batch plating portion 42 at the spaced portion 46 where the adjacent metal wires 411, 411 are spaced apart from each other, and the non-joining portion 44 where the metal wires 411, 411 adjacent to each other in the circumferential direction are not joined with each other with the batch plating portion 42 at the spaced portion 46. In the shield layer 4, the non-joining portion includes a plurality of non-joining portions, and the length of each of the non-joining portions 44 along the cable longitudinal direction is shorter than the winding pitch of the lateral winding shielding portion 41.

According to this configuration, the shield layer 4 is continuous substantially all around (over the substantially entire periphery) via the batch plating portion 42, so that the gap between the metal wires 411, 411 of the lateral winding shielding portion 41 can be blocked by the batch plating portion 42, thereby improving the noise characteristics and suppressing the occurrence of suck-out. In other words, according to the present embodiment, it is possible to achieve the coaxial cable 1 which is resistant to the degradation in the shielding effect and resistant to the occurrence of the rapid attenuation in a predetermined frequency band (for example, frequency band up to 26 GHz). Further, by providing the plurality of non-joining portions 44 in the shield layer 4, it is possible to relax the stress when the coaxial cable 1 is bent and suppress the occurrence of cracks in the batch plating portion 42, so that the shield layer 4 is less likely to have a problem even in a case of bending wiring. Further, by providing the plurality of non-joining portions 44 in the shield layer 4, the coaxial cable 1 can be easily bent, thereby achieving the coaxial cable 1 suitable for bending wiring. Furthermore, by setting the length of the non-joining portion 44 along the cable longitudinal direction shorter than the winding pitch of the lateral winding shielding portion 41, it is possible to suppress the formation of the non-joining portion 44 from adversely affecting the transmission characteristics and the shield characteristics.

(Summary of the Embodiment)

Next, the technical ideas grasped from the aforementioned embodiment will be described with the aid of the reference characters and the like in the embodiment. It should be noted, however, that each of the reference characters and the like in the following descriptions is not to be construed as limiting the constituent elements in the appended claims to the members and the like specifically shown in the embodiment.

[1] A coaxial cable (1) comprising a conductor (2); an insulator (3) covering a periphery of the conductor (2); a shield layer (4) covering a periphery of the insulator (3); and a sheath (5) covering a periphery of the shield layer (4), wherein the shield layer (4) includes a lateral winding shielding portion (41) comprising a plurality of metal wires (411) being helically wrapped around the periphery of the insulator (3) to cover the periphery of the insulator (3), and a batch plating portion (42) comprising a hot dip plating, which is covering a periphery of the lateral winding shielding portion (41), wherein the shield layer (4) includes a joining portion (43) where the metal wires (411, 411) adjacent to each other in a circumferential direction are joined with each other with the batch plating portion (42) at a spaced portion (46) where the adjacent metal wires (411, 411) are spaced apart from each other, and the non-joining portion (44) where the metal wires (411, 411) adjacent to each other in the circumferential direction are not joined with each other with the batch plating portion (42) at the spaced portion (46), wherein a length of the non-joining portion (44) along a cable longitudinal direction is shorter than a winding pitch of the lateral winding shielding portion (41).

[2] The coaxial cable (1) as defined in the above [1], wherein the non-joining portion (44) comprises a through hole (44*a*) penetrating through the batch plating portion (42) in a radial direction.

[3] The coaxial cable (1) as defined in the above [1] or [2], wherein a length of the through hole (44*a*) along a longitudinal direction of the metal wire (411) is 0.1 mm or more and 1.0 mm or less.

[4] The coaxial cable (1) as defined in any one of the above [1] to [3], wherein the non-joining portions (44) are dispersed discontinuously in a cable longitudinal direction, wherein the number of the non-joining portions (44) for each 1 meter in the cable is 10 or more and 20 or less.

[5] The coaxial cable (1) as defined in any one of the above [1] to [4], wherein a width of the non-joining portion (44) in a cable circumferential direction is smaller than an outer diameter of the metal wire (411).

[6] The coaxial cable (1) as defined in any one of the above [1] to [5], wherein the shield layer (4) includes outer peripheral portions (4*a*) where the plurality of the metal wires (411) are being covered with the batch plating portion (42) and inner peripheral portions (4*a*) where the plurality of the metal wires (411) are not being covered with the batch plating portion (42), wherein the outer peripheral portion (4*a*) includes an intermetallic compound (411*c*) between the plurality of metal wires (411) and the batch plating portion (42).

[7] The coaxial cable (1) as defined in [6], wherein the batch plating portion (42) comprises tin and the metal wire (411) comprises a silver-plated anneal copper wire, wherein the intermetallic compound (411*c*) including tin and silver is formed between the plurality of metal wires (411) and the batch plating portion (42).

[8] A cable assembly (10) comprising the coaxial cable (1) as defined in any one of the above [1] to [6]; and a terminal member (11) integrally provided to at least one end portion of the coaxial cable (1).

Although the embodiments of the present invention have been described above, the aforementioned embodiments are not to be construed as limiting the inventions according to the appended claims. Further, it should be noted that not all the combinations of the features described in the embodiments are indispensable to the means for solving the problem of the invention. Further, the present invention can be appropriately modified and implemented without departing from the spirit thereof.

What is claimed is:

1. A coaxial cable, comprising:

a conductor;

an insulator covering a periphery of the conductor;

a shield layer covering a periphery of the insulator; and a sheath covering a periphery of the shield layer, wherein the shield layer includes a lateral winding shielding portion comprising a plurality of metal wires being helically wrapped around the periphery of the insulator to cover the periphery of the insulator, and a batch plating portion comprising a hot dip plating, which is covering a periphery of the lateral winding shielding portion, wherein the shield layer includes a spaced portion where adjacent metal wires, of the plurality of metal wires, in a circumferential direction are spaced apart from each other, and a joining portion where the adjacent metal wires are joined to each other and a non-joining portion where the adjacent metal wires in the circumferential direction are not joined with each other with the batch plating portion at a part in a cable longitudinal direction of the spaced portion, wherein a length of the non-joining portion along the cable longitudinal direction is shorter than a winding pitch of the lateral winding shielding portion, and wherein the non-joining portion comprises a through hole penetrating through the batch plating portion in a radial direction, further comprising a plurality of the non joining portions where the adjacent metal wires in the circumferential direction are not joined with each other with the batch plating portion at a part in a cable longitudinal direction of the spaced portion, wherein the plurality of the non joining portions are dispersed discontinuously in the cable longitudinal direction, wherein the number of the non-joining portions for each 1 meter in the coaxial cable is 10 or more and 20 or less, wherein a plating layer is disposed on a periphery of each of the plurality of metal wires, wherein the plating layer remains on a part of the plurality of metal wires being not brought into contact with the batch plating portion, and wherein a length of the non-joining portion along a longitudinal direction of the plurality of metal wires is shorter than a length of the joining portion along the longitudinal direction of the plurality of metal wires.

2. The coaxial cable according to claim 1, wherein a length of the through hole along a longitudinal direction of the metal wire is 0.1 mm or more and 1.0 mm or less.

3. The coaxial cable according to claim 1, wherein a width of the non-joining portion in a cable circumferential direction is smaller than an outer diameter of a metal wire of the plurality of metal wires.

4. The coaxial cable according to claim 1, wherein the shield layer includes outer peripheral portions where the plurality of the metal wires are being covered with the batch plating portion and inner peripheral portions where the plurality of the metal wires are not being covered with the batch plating portion, and wherein an outer peripheral portion of the plurality of outer peripheral portions includes an intermetallic compound between the plurality of metal wires and the batch plating portion.

5. The coaxial cable according to claim 4, wherein the batch plating portion comprises tin and a metal wire of the plurality of metal wires comprises a silver-plated anneal copper wire, and wherein the intermetallic compound including tin and silver is formed between the plurality of metal wires and the batch plating portion.

6. A cable assembly comprising:

the coaxial cable according to claim 1; and a terminal member integrally provided to at least one end portion of the coaxial cable.

7. The coaxial cable according to claim 1, wherein a metal wire of the plurality of metal wires includes the plating layer on a surface of the metal wire.

8. The coaxial cable according to claim 1, wherein a length of the through hole along a longitudinal direction of the metal wire is 0.1 mm or more and 1.0 mm or less, wherein a width of the non-joining portion in a cable circumferential direction is smaller than an outer diameter of a metal wire of the plurality of metal wires, wherein the shield layer includes outer peripheral portions where the plurality of the metal wires are being covered with the batch plating portion and inner peripheral portions where the plurality of the metal wires are not being covered with the batch plating portion, wherein an outer peripheral portion of the plurality of outer peripheral portions includes an intermetallic compound between the plurality of metal wires and the batch plating portion, and wherein a metal wire of the plurality of metal wires includes the plating layer on a surface of the metal wire.

9. The coaxial cable according to claim 1, wherein the batch plating portion has a corrugated shape along respective outer shapes of the plurality of metal wires fom1ing the lateral winding shielding portion, such that the batch plating portion has a concave shape in locations in the circumferential direction of the coaxial cable which correspond to locations between adjacent metal wires in the circumferential direction of the coaxial cable, wherein the batch plating portion has air gaps at the concave locations between the batch plating portion and the sheath, such that when the coaxial cable is bent, an outer surface of the batch plating portion is stretched to allow bending.

10. The coaxial cable according to claim 1, wherein the shield layer includes outer peripheral portions where the plurality of the metal wires are being covered with the batch plating portion and inner peripheral portions where the plurality of the metal wires are not being covered with the batch plating portion, wherein the plating layer of each of the plurality of metal wires are disposed on the inner peripheral portions of the shield layer in which the plurality of metal wires are not being coated with the batch plating portion.

11. The coaxial cable according to claim 10, wherein the plating layer remains on a part of the plurality of metal wires located inward on a side of the insulator in the radial directions of the coaxial cable.

12. The coaxial cable according to claim 11, wherein the plating layer comprises a conductive layer.

13. The coaxial cable according to claim 11, wherein the plating layer comprises Ag.

14. A coaxial cable, comprising:

a conductor;

an insulator covering a periphery of the conductor;

a shield layer covering a periphery of the insulator; and wherein the shield layer includes a lateral winding shielding portion comprising a plurality of metal wires being helically wrapped around the periphery of the insulator to cover the periphery of the insulator, and a batch plating portion comprising a hot dip plating, which is covering a periphery of the lateral winding shielding portion, wherein the shield layer includes a spaced portion where adjacent metal wires from among the plurality of metal wires, in a circumferential direction are spaced apart from each other, and a joining portion where the adjacent metal wires are joined to each other and a non-joining portion where the adjacent metal wires in the circumferential direction are not joined with each other with the batch plating portion at a part in a cable longitudinal direction of the spaced portion, wherein a length of the non-joining portion along the cable longitudinal direction is shorter than a winding pitch of the lateral winding shielding portion, and wherein the non-joining portion comprises a through hole penetrating through the batch plating portion in a radial direction, wherein a plating layer is disposed on a periphery of each of the plurality of metal wires, wherein the plating layer remains on a part of the plurality of metal wires being not brought into contact with the batch plating portion, and wherein a length of the non-joining portion along a longitudinal direction of the plurality of metal wires is shorter than a length of the joining portion along the longitudinal direction of the plurality of metal wires.

15. The coaxial cable according to claim 14, wherein a metal wire of the plurality of metal wires includes the plating layer on a surface of the metal wire.

16. The coaxial cable according to claim 14, wherein the shield layer includes outer peripheral portions where the plurality of the metal wires are being covered with the batch plating portion and inner peripheral portions where the plurality of the metal wires are not being covered with the batch plating portion, wherein the plating layer of each of the plurality of metal wires are disposed on the inner peripheral portions of the shield layer in which the plurality of metal wires are not being coated with the batch plating portion.

17. A coaxial cable, comprising:

a conductor;

an insulator covering a periphery of the conductor; and a shield layer covering a periphery of the insulator, wherein the shield layer includes a lateral winding shielding portion comprising a plurality of metal wires being wrapped around the periphery of the insulator to cover the periphery of the insulator, and a batch plating portion comprising a hot dip plating, which is covering a periphery of the lateral winding shielding portion, wherein the shield layer includes a spaced portion where adjacent metal wires from among the plurality of metal wires, in a circumferential direction are spaced apart from each other, and a joining portion where the adjacent metal wires are joined to each other and a non-joining portion where the adjacent metal wires in the circumferential direction are not joined with each other with the batch plating portion at a part in a cable longitudinal direction of the spaced portion, wherein a length of the non-joining portion along the cable longitudinal direction is shorter than a winding pitch of the lateral winding shielding portion, wherein a metal wire of the plurality of metal wires includes a plating layer on a surface of the metal wire, and wherein the non-joining portion comprises a through hole penetrating through the batch plating portion in a radial direction, wherein the plating layer is disposed on a periphery of each of the plurality of metal wires, wherein the plating layer remains on a part of the plurality of metal wires being not brought into contact with the batch plating portion, and wherein a length of the non-joining portion along a longitudinal direction of the plurality of metal wires is shorter than a length of the joining portion along the longitudinal direction of the plurality of metal wires.

18. The coaxial cable according to claim 17, further comprising:

a sheath covering a periphery of the shield layer.

19. The coaxial cable according to claim 17, wherein the batch plating portion is disposed between a plurality of metal wires from among the adjacent metal wires spaced apart from each other in the spaced portion.

20. The coaxial cable according to claim 17, wherein the shield layer includes outer peripheral portions where the plurality of the metal wires are being covered with the batch plating portion and inner peripheral portions where the plurality of the metal wires are not being covered with the batch plating portion, wherein the plating layer of each of the plurality of metal wires are disposed on the inner peripheral portions of the shield layer in which the plurality of metal wires are not being coated with the batch plating portion.

* * * * *